Patented Oct. 27, 1942

2,300,065

UNITED STATES PATENT OFFICE 2,300,065

METHOD OF PURIFICATION OF POLYMERIZED ROSINS AND ROSIN ESTERS

Alfred L. Rummelsburg, Wilmington, Del., assignor to Hercules Powder Company, Wilmington, Del., a corporation of Delaware No Drawing. Application December 27, 1940, Serial No. 371,990

17 Claims. (Cl. 260—97)

This invention relates to the purification of polymerized rosins and rosin esters and more particularly to an improved method of purifying polymerized rosins or rosin esters which have been polymerized by means of strong polybasic mineral acid or organic substituted polybasic mineral acid catalysts.

In the polymerization of rosins and rosin esters with acid catalysts such as strong polybasic mineral acids and organic substituted polybasic mineral acids it is necessary to remove the catalyst from the polymerized product in the purification thereof. The presence of even small amounts of the acid catalyst in the final product leads to decomposition and discoloration of the polymerized product in many of the uses thereof. Removal of the acid catalyst has been accomplished in prior art processes by washing the solution of the polymerized material in a suitable solvent with water. Due to the unsaturated character of the polymerized rosin or rosin ester the acids used for the polymerization, particularly the strong polybasic mineral acids or organic substitution products thereof, exhibit a tendency to form addition products at the unsaturated bonds of the rosin material. Thus in the case of sulfuric acid an addition product corresponding to a sulfate is formed. The presence of such addition products in the polymerized mixture seriously handicaps the washing operation for removal of the acid. They behave as emulsifying agents during a washing procedure and therefore make it very difficult and in some cases impossible to effect a separation between the water layer and the solvent solution of the polymerized rosin or rosin ester. The emulsions which they form require long periods of standing before they break and thereby considerably lengthen the time required for the washing operation as well as materially reducing the effective separation of the polymerized material from the wash solution. In the commercial production of polymerized rosin or rosin esters utilizing as catalysts such strong polybasic mineral acids as form the addition product with the rosin or rosin ester, the formation of emulsions in the washing operation has been a factor of such severity as to seriously handicap the production.

It is an object of this invention to provide an improved method of purification of polymerized rosins or rosin esters which have been polymerized by use of strong polybasic mineral acid or organic substituted polybasic mineral acid catalysts. It is a further object to provide an improved and more efficient means of removing catalyst from polymerized rosins or rosin esters which have been polymerized by means of strong polybasic mineral acids or organic substituted polybasic mineral acids. It is a more particular object to provide an improved and more efficient means of removing sulfuric acid from a polymerized rosin or rosin ester which has been polymerized by means of this acid as a catalyst. Other objects of the invention will appear hereinafter.

The above objects are accomplished in accordance with this invention by subjecting a polymerized rosin or rosin ester which has been polymerized by means of a strong polybasic mineral acid or organic substituted polybasic mineral acid prior to a water washing step to a hydrolysis treatment with an aqueous solution of an inorganic acid at a temperature which is sufficient to effect substantially complete hydrolysis of any addition product formed by combination of the polymerization catalyst with the rosin or rosin ester material. On completion of the hydrolysis treatment the acid solution is removed and the polymerized rosin or rosin ester solution washed with water to substantially completely remove the polymerizing acid and the acid used in the hydrolysis treatment. As a direct result of the hydrolysis treatment the water washing step is accomplished without appreciable emulsion formation and a clean separation is easily effected. A materially simplified procedure and an improved yield of polymerized product is thereby obtained. In addition, a polymerized product substantially completely free of traces of the polymerizing acid is made possible. This is of particular importance in relation to use of sulfuric acid since sulfur contamination in even very small amounts has an adverse effect.

The hydrolysis treatment described in accordance with this invention may be applied to the products obtained by polymerization of any of the various grades of rosin or any of the various rosin esters obtained by contact with a strong polybasic mineral acid or an organic substituted polybasic mineral acid as polymerization catalyst. Thus the hydrolysis treatment may be applied to the various grades of either wood or gum rosin or to esters of such rosins as for example the methyl, ethyl, propyl, butyl, ethylene glycol, diethylene glycol, glycerol, pentaerythritol, etc. esters, which have been polymerized by contact with polymerization catalysts such as for example sulfuric acid, phosphoric acid, tetraphosphoric acid, methyl sulfuric acid, ethyl sulfuric acid, acetyl sulfuric acid, acetyl phosphoric acid, ethyl sulfuric acid, benzyl sulfuric acid, etc. The polymerization of rosins and rosin esters with such catalysts is usually carried out on the rosin or rosin ester dissolved in a suitable organic solvent such as for example gasoline, benzene, toluene, cyclohexane, chloroform, ethylene dichloride, dichloroethyl ether, tetrachloroethane, decahydronapthalene, etc.

The inorganic acids which may be used in the form of aqueous solutions thereof in the hydrolysis treatment may be the particular acid used in the polymerization treatment and thus may include any of the above enumerated acids. In addition, aqueous solutions of acids such as hydrochloric, nitric, boric, etc. or acid salts which provide an acid reaction in aqueous medium such as sodium acid sulfate, sodium acid phosphate, etc. may be employed. The concentration of the aqueous solution of the hydrolyzing acid may vary up to as high as 60% by weight and may even be as low as 1% by weight, or in some cases even lower. Preferably the concentration of the hydrolyzing acid will be in the range of about 5% to about 50% by weight. The amount of the aqueous solution of inorganic acid used in the hydrolysis treatment may vary over wide ranges and will include amounts from about $1/10$ to about 10 times the volume of the polymerized rosin or rosin ester solution.

The time required to effect satisfactory hydrolysis will depend to a certain extent on the concentration of the hydrolyzing acid and on the temperature of treatment. It is usually necessary to employ temperatures above about 50° C. to effect the desired hydrolysis, and temperatures up to as high as 200° C. are contemplated. When the temperature of hydrolysis is above the boiling point of the solvent in which the polymerized rosin or rosin ester is dissolved the treatment is carried out under pressure in a closed system such as an autoclave. The time for carrying out the hydrolysis treatment may accordingly vary from about 5 minutes to about 5 hours, depending in any particular case on the temperature and the concentration of hydrolyzing acid employed. Generally speaking the higher the temperature of hydrolysis the shorter the time required. Also, similarly, the more concentrated the acid solution employed the more rapid the hydrolysis.

The concentration of the acid employed in the hydrolyzing treatment is limited by the fact that certain inorganic acids effect a degradation or a discoloration of the polymerized rosin or rosin ester in the more concentrated forms in the elevated temperatures of treatment. However, it has been found that by using a concentration of acid not in excess of about 60% by weight and a temperature not above about 200° C. that substantially no degradation or discoloration of the polymerized material occurs. It has also been found that within these limits substantially no hydrolysis of the ester group in polymerized rosin esters occurs, thereby making the defined process generally applicable to both polymerized rosins and rosin esters. The use of an inert atmosphere during the hydrolysis treatment is contemplated since by this means it is possible to avoid any color degradation of the polymerized materials. For this purpose the inert atmosphere may be provided by gases as carbon dioxide, nitrogen, etc.

In the polymerization of rosin or rosin esters with acids such as concentrated sulfuric acid, a homogeneous or a heterogeneous reaction mixture is obtained depending on the particular organic solvent used for dissolving the rosin material and upon the concentration of rosin in the solvent. Thus with solvents such as benzene, toluene or gasoline a sludge separates from the solution using rosin concentrations up to about 50%, such a sludge consisting of association or addition products of the sulfuric acid with the rosin material. Addition of water to such a heterogeneous polymerization mixture serves to break up such sludge and to divert the combined rosin into the organic solvent and the sulfuric acid into the acid layer. If desired, the sludge may be separated to facilitate production of a lighter colored polymerized product. With such mixtures the hydrolysis treatment may be conveniently carried out by addition of sufficient water to provide an aqueous acid layer containing up to about 60% of sulfuric acid and by heating the mixture with suitable agitation at a temperature and for a time sufficient to effect a break-up of any addition product of the acid with the rosin or rosin ester such as in the ranges defined above. With use of concentrated sulfuric acid and solvents such as benzene, toluene or gasoline but using a rosin concentration of 60% or higher, homogeneous reaction mixtures are obtained which may be subjected to the hydrolysis treatment directly or may be diluted with additional solvent to separate a sludge, and then hydrolyzed as above.

In the polymerization of rosin or rosin esters with a polybasic mineral acid catalyst such as concentrated sulfuric acid using a solvent for the rosin or rosin ester which provides a homogeneous reaction mixture at both low and high rosin concentrations such as, for example, ethylene dichloride, dichloroethyl ether, tetrachloroethane, etc., addition of water may be made to provide an aqueous acid concentration of up to about 60% and the hydrolysis treatment carried out on such a mixture by heating as described above. If desired, additional acid may be added or additional aqueous solution of acid to provide larger amounts of aqueous acid for the hydrolysis treatment.

On completion of the hydrolysis treatment the aqueous acid used in the hydrolysis may be drawn off from the polymerized rosin or rosin ester solution and the polymerized material subjected to successive washings with water to remove the last traces of acid. A small amount of a neutral salt such as sodium chloride may be included in the wash water to effect a more rapid separation of the two layers. Thus a 2.5% sodium chloride solution provides an effective washing medium. The washing operation may be effected in considerably less time than is possible without the prior hydrolysis treatment and a more efficient separation of the polymerized rosin solution is obtained.

The above hydrolysis treatment provides particularly desirable results when applied to separation of polymerized rosin from the polymerized rosin sludge produced under certain conditions as described above, and provides an efficient means for recovering polymerized rosin from such sludge.

The following examples illustrate the effect of the hydrolysis treatment described in accordance with this invention in the purification of polymerized rosins and rosin esters. In the examples all parts expressed are by weight unless otherwise designated.

EXAMPLE I

To a solution of 262 parts by weight of K wood rosin in 600 parts of benzene, 70 parts of 95% sulfuric acid were added with vigorous agitation during a period of about 12 minutes at a temperature of 11–15° C. Agitation was continued for 35 minutes at 15° C. and the mixture then allowed to stand another 15 minutes at 15° C. The benzene solution was then decanted from the sludge. The benzene solution amounted to 820 parts and contained 1.2% of sulfuric acid. One hundred parts of water were then added giving approximately a 9% solution of sulfuric acid in the water. This mixture was heated with agitation under reflux at a temperature of 80° C. for one hour. The aqueous sulfuric acid solution was then drawn off and the benzene solution washed three consecutive times with 1000 part portions of water at a temperature of 18–25° C. and permitting the mixture to stand after each wash until satisfactory separation could be effected. The procedure was duplicated with use of 2.5% sodium chloride solution instead of water in the washing.

A similar polymerization mixture was subjected to a hydrolysis treatment at the same temperature and for the same time but with use of a 50% sulfuric acid solution. Washing was carried out as above both with and without sodium chloride in the water. As a comparator to the above two procedures a similar polymerization mixture was washed with water without the hydrolysis treatment. The time in minutes required for separation of each wash solution and the analysis of the polymerized rosin obtained are tabulated below in Table 1.

Table 1

|  | No hydrolysis | Hydrolysis 9% $H_2SO_4$ | Hydrolysis 50% $H_2SO_4$ |
|---|---|---|---|
| First wash: |  |  |  |
| No NaCl | 15 min.[1] | 20 min. | ? min. |
| NaCl | 5 min. | 1 min. | 1 min. |
| Second wash: |  |  |  |
| No NaCl | 30 min.[1] | 15 min. | 15 min.[1] |
| NaCl | 5 min. | <1 min. | 5 min. |
| Third wash: |  |  |  |
| No NaCl | 60 min.[1] | 15 min.[1] | 15 min.[1] |
| NaCl | 30 min.[1] | <1 min. | 5 min. |
| Analysis of rosin: |  |  |  |
| Acid No | 166 | 166 | 165. |
| Melting point | 97° C | 98° C | 105° C. |
| Color grade | M | M+ | K+. |
| Percent sulfur | 0.027 | 0.006 | 0.013. |

[1] Both layers hazy.

EXAMPLE II

The polymerization procedure of Example I was repeated but with use of a polymerization temperature of 23–25° C. The polymerization mixture without separation of the sludge was then subjected to a hydrolysis treatment with 300 parts of 50% aqueous sulfuric acid with agitation under reflux at a temperature of about 80° C. for one hour. The acid layer was then separated and the benzene solution of the polymerized rosin washed three successive times with 1000 part portions of water. In a duplicate preparation the washing was carried out with water containing 2.5% sodium chloride. For purposes of comparison a similar polymerization was carried out but without the hydrolysis treatment. On completion of the washing procedure the benzene was evaporated to recover the polymerized rosin. The time required for separation of each wash solution and the analysis of each polymerized rosin are shown in Table 2 below.

Table 2

|  | No hydrolysis | Hydrolysis 50% $H_2SO_4$ |
|---|---|---|
| First wash: |  |  |
| No NaCl | 8 min.[1] | 7 min. |
| NaCl | 8 min. | 2 min. |
| Second wash: |  |  |
| No NaCl | 15 min.[1] | 15 min.[1] |
| NaCl | 5 min. | 3 min. |
| Third wash: |  |  |
| No NaCl | 15 min.[1] | 15 min.[1] |
| NaCl | 9 min.[1] | 3 min. |
| Analysis of rosin: |  |  |
| Acid No | 153 | 154. |
| Melting point | 109° C | 108° C. |
| Color grade | F+ | G. |
| Percent sulfur | 0.062 | 0.025. |

[1] Both layers cloudy.

EXAMPLE III

To a solution of 400 parts of WG gum rosin in 157 parts of narrow range gasoline having a boiling range of 95–130° C., 100 parts of 85% sulfuric acid were added with agitation over a period of ½ hour maintaining the temperature at 30–32° C. The homogeneous reaction mixture obtained was agitated for 1½ hours at the same temperature and the reaction mixture then poured into 740 parts of the narrow range gasoline with agitation. The gasoline solution was then separated from the sludge and divided into two equal portions. The first portion was subjected to a hydrolysis treatment with 100 parts of 10% sulfuric acid at a temperature of 80° C. for one hour with agitation. The acid layer was then separated and the gasoline solution subjected to three successive washes with 1000 part portions of water containing 2.5% sodium chloride at a temperature of 18–25° C. Each wash solution was shaken with the polymerized rosin solution for three minutes, allowed to stand and the separation time then determined. The second portion of the polymerized rosin solution was subjected to the same washing treatment but without being subjected to the hydrolysis procedure. Table 3 below shows the separation time in each case and the analysis of each polymerized rosin obtained.

Table 3

|  | No hydrolysis | Hydrolysis 10% $H_2SO_4$ |
|---|---|---|
| First wash | 30 min.[1] | 3 min. |
| Second wash | 30 min.[1] | 3 min. |
| Third wash | 30 min.[1] | 3 min. |
| Analysis of rosin: |  |  |
| Acid No | 151 | 151. |
| Melting point | 114° C | 114° C. |
| Color grade | X | WW. |
| Percent sulfur | 0.05 | 0.006. |

[1] A gel or curd formed at the interface between the two layers which did not break on standing. No gel formed after hydrolysis.

EXAMPLE IV

To a solution of 300 parts of K wood rosin in 560 parts of ethylene dichloride, 70 parts of 95% sulfuric acid were added with agitation over a period of 10 minutes while maintaining the temperature at 18° C. The mixture was then agitated for ½ hour at a temperature of 18–20° C. To the homogeneous reaction mixture 150 parts of water were then added with agitation over a period of 25 minutes at a temperature of 23° C., thereby diluting the sulfuric acid layer to approximately 30% concentration. The reaction mixture with the 30% acid dispersed therein was divided into two equal portions. The first portion was subjected to a hydrolysis treatment with 200 parts of 10% aqueous sulfuric acid solution for one hour at a temperature of 80° C. The concentration of the hydrolysis acid was thus 20%. After completion of the hydrolysis treatment the polymerized rosin solution was subjected to three consecutive washes with 1000 part portions of water containing 2% sodium chloride. The second portion of the polymerized rosin solution was subjected to a similar washing procedure but without the hydrolysis treatment. The ethylene dichloride was evaporated from the washed solutions to provide the polymerized rosin. In Table 4 below the time required for each wash solution to separate after an agitation period of three minutes is shown together with the analysis of the polymerized rosin product.

Table 4

|  | No hydrolysis | Hydrolysis 20% $H_2SO_4$ |
|---|---|---|
| First wash: |  |  |
| No NaCl | 20 min.[1] | 15 min.[1] |
| NaCl | 6 min.[1] | 1.5 min. |
| Second wash: |  |  |
| No NaCl | 30 min.[1] |  |
| NaCl | 7 min.[1] | 1.5 min. |
| Third wash: |  |  |
| No NaCl |  |  |
| NaCl | 3 min.[1] | 1 min. |
| Analysis of rosin: |  |  |
| Acid No | 148 | 148. |
| Melting point | 117° C | 117° C. |
| Color grade | F | E. |
| Percent sulfur | 0.06 | 0.017. |

[1] Both layers milky.

EXAMPLE V

To a solution of 300 parts of K wood rosin in 560 parts of benzene, 70 parts of 95% sulfuric acid were added with agitation over a period of 10 minutes maintaining a temperature of 20° C. After continuing the agitation for an additional half hour at the same temperature, the reaction mixture was allowed to stand at 20° C. for another 15 minutes. The benzene solution was then separated from the sludge which formed and divided into two equal portions. The first portion was subjected to a hydrolysis treatment with 5.25 parts of 25% aqueous phosphoric acid solution by heating at 80° C. with agitation for one hour. The acid layer was then separated and the benzene solution washed three consecutive times with 1000 part portions of water containing 2.5% sodium chloride. The second portion was subjected to a similar washing procedure but without the hydrolysis treatment.

A similar polymerization to the above was carried out and the benzene solution again divided into two equal portions. One portion was subjected to a hydrolysis treatment with 500 parts of 10% aqueous hydrochloric acid solution under the same conditions as above. The second portion was subjected to a similar hydrolysis treatment but with 300 parts of 15% aqueous boric acid solution. Each solution was then subjected to a washing treatment similar to that employed above.

In Table 5 below the time required for separation of each wash solution and the analysis of the polymerized rosin obtained after evaporation of the solvent in each case are shown.

Table 5

|  | No hydrolysis | Hydrolysis 25% $H_3PO_4$ | Hydrolysis 10% HCl | Hydrolysis 15% $H_3BO_3$ |
|---|---|---|---|---|
| First wash | 17 min | 7 min | 3 min | 3 min. |
| Second wash | 20 min.[1] | 4 min | 3 min | 3 min. |
| Third wash | 45 min.[1] | 1.5 min | 3 min | 3.5 min. |
| Analysis of rosin: |  |  |  |  |
| Acid No | 160 | 160 | 160 | 161. |
| Melting point | 104° C | 104° C | 102° C | 103° C. |
| Color grade | K | I | H | K. |
| Percent sulfur | 0.028 | 0.007 | 0.007 | 0.012. |

[1] Both layers milky.

EXAMPLE VI

To a solution of 300 parts of a glycerol ester of wood rosin in 500 parts of benzene, 100 parts of 95% sulfuric acid were added with agitation over a period of 20 minutes while maintaining the temperature at 15–20° C. Agitation of the mixture was continued for 1¼ hours at the same temperature, the sludge then allowed to settle and the benzene solution decanted therefrom and divided into two equal portions. The first portion was subjected to a hydrolysis treatment with 200 parts of 15% aqueous sulfuric acid solution for 5 hours at a temperature of 80° C. After separation of the acid the benzene solution was washed three successive times with 1000 part portions of water containing 2.5% sodium chloride. The second portion was subjected to the washing treatment without hydrolysis. In Table 6 below the time required for separation of each wash solution and the analysis of the ester after evaporation of the solvent are given.

Table 6

|  | No hydrolysis | Hydrolysis 15% $H_2SO_4$ |
|---|---|---|
| First wash | 60 min.[1] | 5 min.[1] |
| Second wash | 120 min.[1] | 10 min.[1] |
| Third wash | 720 min.[1] | 10 min.[1] |
| Analysis of rosin: |  |  |
| Acid No | 8 | 8. |
| Melting point | 116° C | 116° C. |
| Color grade | H | G. |
| Percent sulfur | 0.07 | 0.01. |

[1] Both layers cloudy.

EXAMPLE VII

Four hundred parts of WG gum rosin were dissolved in 225 parts of narrow range gasoline (B. P. 200°–270° F.) and the solution agitated for 4 hours with 70 parts of tetraphosphoric acid under reflux at 80–90° C. The reaction solution was then diluted with 515 parts of the narrow range gasoline with agitation, cooled to room temperature and allowed to stand for 15 minutes. The solution layer was then decanted off from the sludge layer and divided into two equal parts. The first part was washed with three consecutive 1000 part portions of water at 75° C., agitating each solution thoroughly and then permitting to stand for separation into layers. A curd formed during the washing operation which materially increased the separation time and which made a clean separation difficult. The second part of the polymerized rosin solution was agitated for one hour under reflux at 80–90° C. with 400 parts of a 25% sulfuric acid solution. After separation of the aqueous acid layer, the solution was washed with three consecutive 1000 part portions of water as above. No curd formation occurred and a clean separation of the water layer from the solution layer was obtained on short standing. Evaporation of the gasoline from each of the two polymerized rosin solutions yielded polymerized products having the following analyses:

Table 7

|  | Original rosin | Polymerized rosin | |
| --- | --- | --- | --- |
|  |  | No hydrolysis | Hydrolysis 25% H₂SO₄ |
| Acid No | 164 | 152 | 152 |
| Melting point | 83° C. | 81° C. | 81° C. |
| Color grade | WG | K+ | K+ |

The polymerized product obtained above was contaminated with oils formed during the polymerization. By subjecting the product to vacuum distillation at 1 mm. pressure 40% of oils and unpolymerized rosin were distilled off. The residual polymerized rosin had an acid number of 163 and a drop melting point of 100° C.

It will be readily apparent from the above examples that the hydrolysis treatment described in accordance with this invention makes it possible to remove acid catalysts from polymerized rosin or rosin ester solutions in a much more efficient manner. Thus the examples illustrate that a cleaner separation and a more rapid separation of the wash solutions from the polymerized rosin or rosin ester solutions is possible by subjecting the polymerized rosin or rosin ester solution to the described hydrolysis treatment prior to water washing. By use of such a hydrolysis procedure it is now possible to satisfactorily wash such polymerized rosin or rosin ester solutions conveniently and effectively to remove the last traces of acid catalyst therefrom. The hydrolysis treatment also makes it commercially practical to polymerize rosin with strong polybasic mineral acid catalysts. The hydrolysis treatment also makes it possible to produce a sulfuric acid polymerized rosin or rosin ester which will contain less combined sulfur than has been possible by any previously known purification procedure.

Although the specific examples shown above illustrate the process of the invention in terms of a batch procedure it will be obvious that the hydrolysis treatment can also be carried out in a continuous manner, for example by passing the polymerized rosin solutions and the hydrolyzing acid concurrently through a contact chamber or tube, or by passing the polymerized rosin solution up through the hydrolyzing acid, or by passing a solution of the polymerized rosin or rosin ester and the hydrolyzing acid countercurrently through any suitable device, as well as by other procedures which will be apparent to those skilled in the art. Also, the hydrolysis treatment may be included as a step in the continuous polymerization of rosin by the process utilizing a sulfuric acid sludge catalyst, such as is described in an application of Clell E. Tyler, Serial No. 328,864, filed April 10, 1940, and in an application of C. E. Tyler and W. N. Traylor, Serial No. 328,866, filed April 10, 1940.

It will be understood that the details and examples hereinbefore set forth are illustrative only, and that the invention as herein broadly described and claimed is in no way limited thereby.

What I claim and desire to protect by Letters Patent is:

1. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an inorganic acid to effect substantially complete hydrolysis of any addition product formed by combination of the polymerization catalyst with the rosin or rosin ester material.

2. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an inorganic acid at a temperature within the range of about 50° C. to about 200° C. to effect substantially complete hydrolysis of any addition product formed by combination of the polymerization catalyst with the rosin or rosin ester material.

3. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an inorganic acid having a concentration up to about 60 per cent by weight at a temperature within the range of about 50° C. to about 200° C. to effect substantially complete hydrolysis of any addition product formed by combination of the polymerization catalyst with the rosin or rosin ester material.

4. In the polymerization of rosin with a polymerization catalyst selected from the group consisting of strong polybasic mineral acids and acidic organic substituted polybasic mineral acids, the step in the purification which comprises hydrolyzing the polymerized rosin prior to water washing with an aqueous solution of an inorganic acid having a concentration up to about 60 per cent by weight at a temperature within the range of about 50° C. to about 200° C. to effect substantially complete hydrolysis of any addition product formed by combination of the polymerization catalyst with the rosin or rosin ester.

5. In the polymerization of rosin with sulfuric acid as a polymerization catalyst, the step in the purification which comprises hydrolyzing the polymerized rosin prior to water washing with an aqueous solution of an inorganic acid having a concentration up to about 60 per cent by weight at a temperature within the range of about 50° C. to about 200° C. for a sufficient time to effect substantially complete hydrolysis of any addition product formed by combination of the sulfuric acid with the rosin material.

6. In the polymerization of rosin with phosphoric acid as a polymerization catalyst, the step in the purification which comprises hydrolyzing the polymerized rosin prior to water washing with an aqueous solution of an inorganic acid having a concentration up to about 60 per cent by weight at a temperature within the range of about 50° C. to about 200° C. for a sufficient time to effect substantially complete hydrolysis of any addition product formed by combination of the phosphoric acid with the rosin material.

7. In the polymerization of rosin with tetraphosphoric acid as a polymerization catalyst, the step in the purification which comprises hydrolyzing the polymerized rosin prior to water washing with an aqueous solution of an inorganic acid having a concentration up to about 60 per cent by weight at a temperature within the range of about 50° C. to about 200° C. for a sufficient time to effect substantially complete hydrolysis of any addition product formed by combination of the tetraphosphoric acid with the rosin material.

8. In the polymerization of rosin dissolved in a solvent therefor with a concentrated sulfuric acid catalyst, the step in the purification which comprises hydrolyzing the polymerized rosin solution prior to water washing with an aqueous solution of an inorganic acid having a concentration up to about 60 per cent by weight at a temperature within the range of about 50° C. to about 200° C. to effect substantially complete hydrolysis of any addition product formed by combination of the sulfuric acid with the rosin material.

9. In the polymerization of rosin dissolved in a solvent therefor with a concentrated sulfuric acid catalyst, the step in the purification which comprises hydrolyzing the polymerized rosin solution prior to water washing with an aqueous solution of a sulfuric acid having a concentration up to about 60 per cent by weight at a temperature within the range of about 50° C. to about 200° C. to effect substantially complete hydrolysis of any addition product formed by combination of the sulfuric acid with the rosin material.

10. In the polymerization of rosin with sulfuric acid as a polymerization catalyst, in which the polymerization is carried out in a solvent and under conditions which provide a homogeneous polymerization mixture, the step in the purification which comprises diluting the polymerization mixture with water and heating the mixture at a temperature within the range of about 50° C. to about 200° C. for a time which is sufficient to effect substantially complete hydrolysis of any addition product formed by combination of the sulfuric acid with the rosin material.

11. In the polymerization of rosin with sulfuric acid as a polymerization catalyst, in which the polymerization is carried out in a solvent and under conditions which provide a heterogeneous polymerization mixture, the step in the purification which comprises diluting the polymerization mixture with water and heating the mixture at a temperature within the range of about 50° C. to about 200° C. for a time which is sufficient to effect substantially complete hydrolysis of any addition product formed by combination of the sulfuric acid with the rosin material.

12. In the polymerization of rosin dissolved in ethylene dichloride with sulfuric acid as a polymerization catalyst, the step in the purification which comprises diluting the polymerized mixture with water and heating the mixture at a temperature within the range of about 50° C. to about 200° C. for a time which is sufficient to effect substantially complete hydrolysis of any addition product formed by combination of the sulfuric acid with the rosin material which provides a homogeneous polymerization mixture.

13. In the polymerization of rosin dissolved in a solvent therefor with a concentrated sulfuric acid catalyst, the step in the purification which comprises hydrolyzing the polymerized rosin prior to water washing with an aqueous solution of sulfuric acid having a concentration up to about 60 per cent by weight at a temperature within the range of about 50° C. to about 200° C. for a time which is sufficient to effect substantially complete hydrolysis of any addition product formed by combination of the polymerization catalyst with the rosin material.

14. In the polymerization of rosin dissolved in a solvent therefor with a concentrated sulfuric acid catalyst, the step in the purification which comprises hydrolyzing the polymerized rosin prior to water washing with an aqueous solution of sulfuric acid having a concentration up to about 60 per cent by weight at a temperature within the range of about 50° C. to about 100° C. for a time which is sufficient to effect substantially complete hydrolysis of any addition product formed by combination of the polymerization catalyst with the rosin material.

15. In the polymerization of rosin dissolved in benzol with a concentrated sulfuric acid catalyst, the step in the purification which comprises hydrolyzing the polymerized rosin prior to water washing with an aqueous solution of sulfuric acid having a concentration up to about 60 per cent by weight at a temperature within the range of about 50° C. to about 100° C. for a time which is sufficient to effect substantially complete hydrolysis of any addition product formed by combination of the polymerization catalyst with the rosin material.

16. In the polymerization of rosin with phosphoric acid as a polymerization catalyst, the step in the purification which comprises hydrolyzing the polymerized rosin prior to water washing with an aqueous solution of phosphoric acid having a concentration up to about 60 per cent by weight at a temperature within the range of about 50° C. to about 200° C. for a sufficient time to effect substantially complete hydrolysis of any addition product formed by combination of the phosphoric acid with the rosin material.

17. In the polymerization of rosin with tetraphosphoric acid as a polymerization catalyst, the step in the purification which comprises hydrolyzing the polymerized rosin prior to water washing with an aqueous solution of tetraphosphoric acid having a concentration up to about 60 per cent by weight at a temperature within the range of about 50° C. to about 200° C. for a sufficient time to effect substantially complete hydrolysis of any addition product formed by combination of the tetraphosphoric acid with the rosin material.

ALFRED L. RUMMELSBURG.